United States Patent
Amundson et al.

(10) Patent No.: US 10,941,957 B2
(45) Date of Patent: Mar. 9, 2021

(54) BUILDING CONTROLLER UTILIZING MULTIPLE SENSORS AND A PROGRAMMABLE SCHEDULE

(71) Applicant: Ademco Inc., Golden Valley, MN (US)

(72) Inventors: John Amundson, Minneapolis, MN (US); David J. Emmons, Plymouth, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 16/186,428

(22) Filed: Nov. 9, 2018

(65) Prior Publication Data

US 2020/0149773 A1 May 14, 2020

(51) Int. Cl.
| | |
|---|---|
| F24F 11/80 | (2018.01) |
| F24F 11/46 | (2018.01) |
| H04W 84/18 | (2009.01) |

(52) U.S. Cl.
CPC .............. F24F 11/80 (2018.01); F24F 11/46 (2018.01); H04W 84/18 (2013.01)

(58) Field of Classification Search
None
See application file for complete search history.

(56) References Cited

U.S. PATENT DOCUMENTS

| | | | | | |
|---|---|---|---|---|---|
| 5,833,134 | A * | 11/1998 | Ho | ..................... | G05D 23/1905 236/49.3 |
| 2003/0033028 | A1* | 2/2003 | Bennett | ................ | G05B 19/042 700/10 |
| 2007/0045429 | A1* | 3/2007 | Chapman, Jr. | ...... | G05D 23/1934 236/46 C |
| 2008/0179053 | A1* | 7/2008 | Kates | ....................... | F24F 3/044 165/208 |
| 2008/0290183 | A1* | 11/2008 | Laberge | ............. | G05D 23/1931 236/94 |
| 2011/0160913 | A1* | 6/2011 | Parker | ................. | F24D 19/1048 700/276 |
| 2014/0031990 | A1* | 1/2014 | Filbeck | .............. | G05D 23/1904 700/276 |
| 2016/0047569 | A1* | 2/2016 | Fadell | ................... | G06F 1/3265 236/1 C |
| 2017/0023272 | A1* | 1/2017 | Erickson | ................ | G05B 15/02 |
| 2017/0307239 | A1* | 10/2017 | Wallace | ............... | G05B 19/042 |
| 2018/0087795 | A1* | 3/2018 | Okita | ........................ | F24F 11/52 |
| 2018/0313564 | A1* | 11/2018 | Gavin | ...................... | F24F 11/50 |
| 2019/0212025 | A1* | 7/2019 | Martin | ..................... | F24F 11/32 |
| 2019/0242592 | A1* | 8/2019 | Adamek | .................. | F24F 11/30 |

OTHER PUBLICATIONS

Lloyd, "How to Manually Select Which Ecobee Sensor to Use," HowToGeek, 17 pages, Jun. 30, 2016.
"User Guide: Ecobee3," Ecobee, 42 pages, 2014.
"Learn about the Nest Temperature Sensor and how to change settings," Nest Support, 9 pages, downloaded Jul. 16, 2018.

\* cited by examiner

Primary Examiner — Ramesh B Patel
(74) Attorney, Agent, or Firm — Shumaker & Sieffert, P.A.

(57) ABSTRACT

An HVAC system may include a building controller and one or more sensors. The building controller may be configured to receive one or more temperature readings from the one or more sensors located in a building and determine an extremum temperature reading. The building controller may be configured to control one or more components of an HVAC system of a building to control the extremum temperature in accordance with a programmed temperature set point.

16 Claims, 9 Drawing Sheets

BUILDING CONTROLLER UTILIZING MULTIPLE SENSORS AND A PROGRAMMABLE SCHEDULE

TECHNICAL FIELD

The present disclosure pertains to a Heating, Ventilation, and/or Air Conditioning (HVAC) system for a building. More particularly, the present disclosure pertains to HVAC controllers and methods for controlling HVAC systems utilizing multiple sensors and a home and/or away programmed schedule.

BACKGROUND

Heating, Ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. Some HVAC systems rely on one or more sensors located at various locations in or around the building, typically in common and/or occupied locations in or around the building, to facilitate control of the one or more environmental conditions within the building. In this manner, temperatures in non-occupied locations may not be monitored, leading to temperatures in such locations to fall outside an ideal temperature setting. Improvements in controlling environmental conditions within the building would be desirable.

SUMMARY

The present disclosure relates generally to HVAC systems, and more particularly, to HVAC controllers and methods for controlling HVAC systems. In some instances, an HVAC system may include a building controller and one or more wireless devices, such as a temperature sensor, a humidity sensor, an equipment interface module and/or any other suitable wireless sensor or device. The building controller may be configured to control one or more components of an HVAC system of a building. In an example of the disclosure, the building controller may include one or more inputs for receiving a temperature reading from each of two or more temperature sensors located within the building, wherein at least one remote temperature sensor is located remotely from the building controller. The building controller may further include one or more outputs, wherein the one or more outputs may provide one or more control signals to the HVAC system of the building. A controller may be operatively coupled to the one or more inputs and the one or more outputs. The controller may be configured to determine an extremum temperature reading from the temperature readings in order to provide one or more control signals to the HVAC system via the one or more outputs for controlling the extremum temperature in accordance with a programmed temperature set point.

Another example of the disclosure is a method for controlling an HVAC system of a building. An extremum temperature reading may be repeatedly determined from temperature readings reported by each of two or more temperature sensors located at different locations within the building. The controller may receive one or more readings from one or more moisture sensors that provide an indication of measurable water proximate the one or more moisture sensors. The HVAC system of the building may be controlled in a manner that controls the extremum temperature reading in accordance with a programmed temperature set point and the one or more readings from the one or more moisture sensors.

Another example of the disclosure is a method for controlling an HVAC system of a building. A temperature reading may be received from each of two or more temperature sensors spaced within the building, and the HVAC system of the building may be controlled in a manner that controls a temperature reading from a first one of the two or more temperature sensors in accordance with a first energy saving temperature set point. When the temperature reading from a second one of the two or more temperature sensors is determined to satisfy a predetermined condition, the HVAC system of the building may be controlled in a manner that controls the temperature reading from the second one of the two or more temperature sensors in accordance with a second energy saving temperature set point during the time that the temperature reading from the second one of the two or more temperature sensors continues to satisfy the predetermined condition, and returning to controlling. The HVAC system of the building may be controlled in a manner that controls the temperature reading from the first one of the two or more temperature sensors in accordance with the first energy saving temperature set point when the temperature reading from the second one of the two or more temperature sensors no longer satisfies the predetermined condition.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE FIGURES

The disclosure may be more completely understood in consideration of the following description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like numerals indicate like elements throughout the several views. The description and drawings show several embodiments which are meant to be illustrative in nature.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems, and other systems. While HVAC systems with HVAC controllers are used as an example below, it should be recognized that the concepts disclosed herein can be applied to building automation systems more generally.

Figure 1:
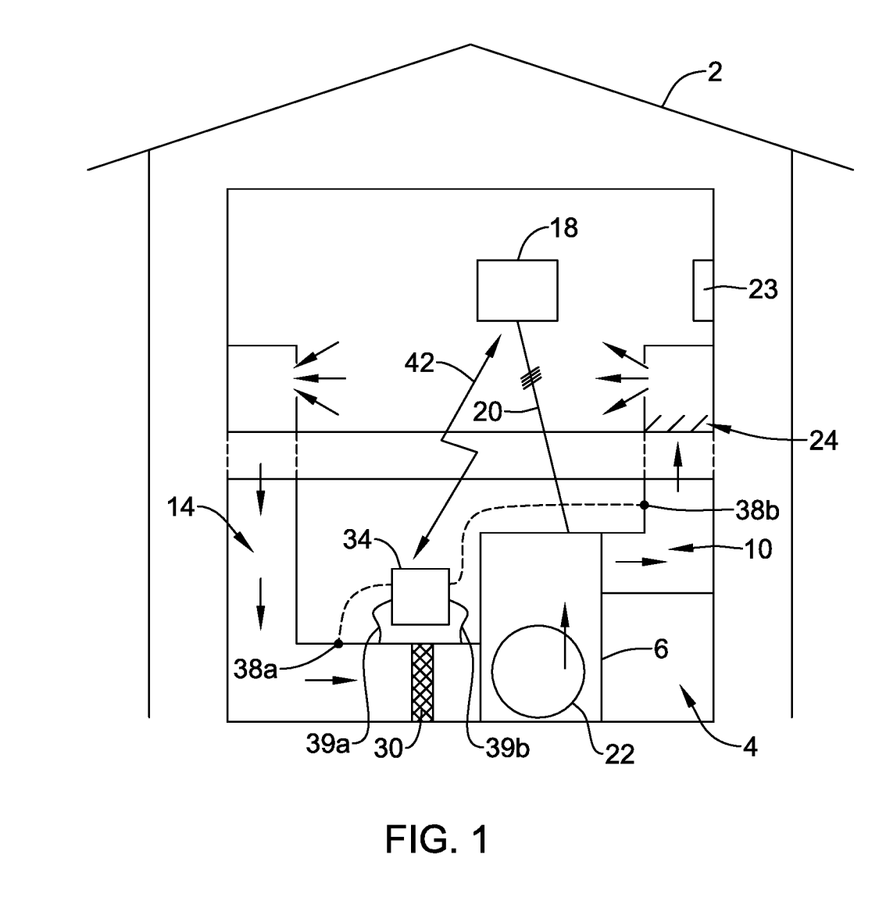
FIG. 1 is a schematic view of an illustrative HVAC system servicing a building.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g., within the thermostat housing) or have access to one or more temperature sensor(s) for sensing ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g., forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g., forced warm air furnace) for heating via return air ducts 14. Similarly, when a cool call signal is provided by the HVAC controller(s) 18, an HVAC component 6 (e.g., air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g., air conditioning unit) for cooling via return air ducts 14. In some cases, the HVAC system 4 may include an internet gateway or other device 23 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may, in addition to controlling the HVAC under the direction of the thermostat, be configured to measure or detect a change in a given parameter between the return air side and the discharge air side of the HVAC system 4. For example, the equipment interface module 34 may measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta t for the heating and cooling modes may be calculated by subtracting the return air temperature from the discharge air temperature (e.g., delta T=discharge air temperature−return air temperature).

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In some instances, the equipment interface module 34 may communicate, relay or otherwise transmit data regarding the selected parameter (e.g., temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
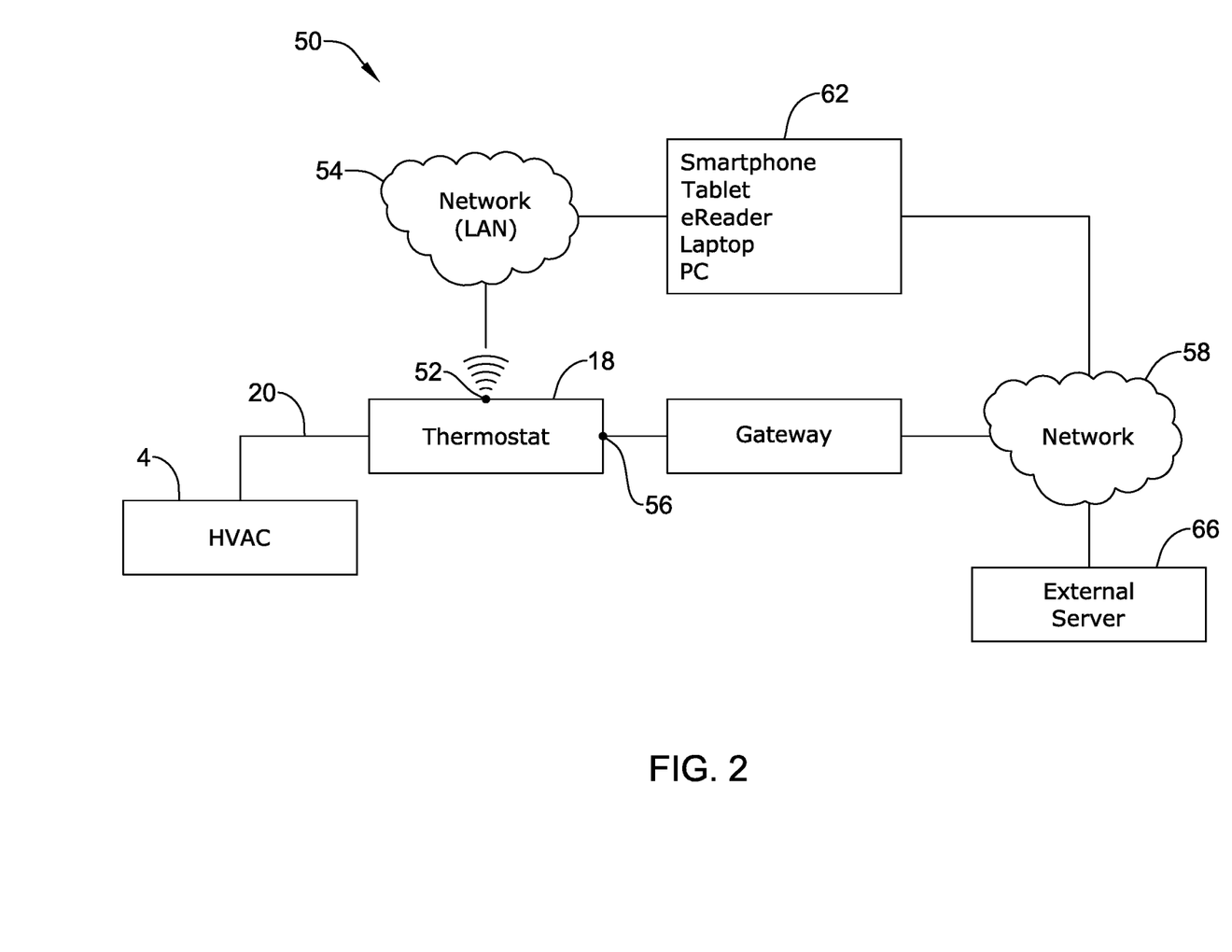
FIG. 2 is a schematic view of an illustrative HVAC control system that may facilitate access and/or control of the HVAC system of FIG. 1.

FIG. 2 is a schematic view of an illustrative HVAC control system 50 that facilitates remote access and/or control of the illustrative HVAC system 4 shown in FIG. 1. The HVAC control system 50 may be considered a building automation system or part of a building automation system. The illustrative HVAC control system 50 includes an HVAC controller, as for example, HVAC controller 18 (see FIG. 1) that is configured to communicate with and control one or more HVAC components 6 of the HVAC system 4. As discussed above, the HVAC controller 18 may communicate with the one or more HVAC components 6 of the HVAC system 4 via a wired or wireless link 20. Additionally, the HVAC controller 18 may communicate over one or more wired or wireless networks that may accommodate remote access and/or control of the HVAC controller 18 via another device such as a smart phone, tablet, e-reader, laptop computer, personal computer, key fob, or the like. As shown in FIG. 2, the HVAC controller 18 may include a first communications port 52 for communicating over a first network 54, and in some cases, a second communications port 56 for communicating over a second network 58. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. Is some cases, the wireless local area network 54 may be an ad-hoc wireless network, but this is not required.

In some cases, the HVAC controller 18 may be programmed to communicate over the second network 58 with an external web service hosted by one or more external web server(s) 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services sometimes including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like from the web server 66 over the second network 58. In some instances, the HVAC controller 18 may be configured to receive one or more user profiles having at least one operational parameter setting that is selected by and reflective of a user's preferences. In still other instances, the HVAC controller 18 may be configured to receive local weather data, weather alerts and/or warnings, major stock index ticker data, traffic data, and/or news headlines over the second network 58. These are just some examples.

Depending upon the application and/or where the HVAC user is located, remote access and/or control of the HVAC controller 18 may be provided over the first network 54 and/or the second network 58. A variety of remote wireless devices 62 may be used to access and/or control the HVAC controller 18 from a remote location (e.g., remote from the HVAC controller 18) over the first network 54 and/or the second network 58 including, but not limited to, mobile phones including smart phones, tablet computers, laptop or personal computers, wireless network-enabled key fobs, e-readers, and/or the like. In many cases, the remote wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, an application program code (i.e., app) stored in the memory of the remote device 62 may be used to remotely access and/or control the HVAC controller 18. The application program code (app) may be downloaded from an external web service, such as the web service hosted by the external web server 66 (e.g., Honeywell's TOTAL CONNECT™ web service) or another external web service (e.g., ITUNES® or Google Play). In some cases, the app may provide a remote user interface for interacting with the HVAC controller 18 at the user's remote device 62. For example, through the user interface provided by the app, a user may be able to change operating parameter settings such as, for example, temperature set points, humidity set points, start times, end times, schedules, window frost protection settings, accepts software updates and/or the like. Communications may be routed from the user's remote device 62 to the web server 66 and then, from the web server 66 to the HVAC controller 18. In some cases, communications may flow in the opposite direction such as, for example, when a user interacts directly with the HVAC controller 18 to change an operating parameter setting such as, for example, a schedule change or a set point change. The change made at the HVAC controller 18 may be routed to the web server 66 and then from the web server 66 to the remote device 62 where it may be reflected by the application program executed by the remote device 62.

In some cases, a user may be able to interact with the HVAC controller 18 via a user interface provided by one or more web pages served up by the web server 66. The user may interact with the one or more web pages using a variety of internet capable devices to effect a setting or other change at the HVAC controller 18, and in some cases view usage data and energy consumption data related to the usage of the HVAC system 4. In some cases, communication may occur between the user's remote device 62 and the HVAC controller 18 without being relayed through a server such as external server 66. These are just some examples.

Figure 3:
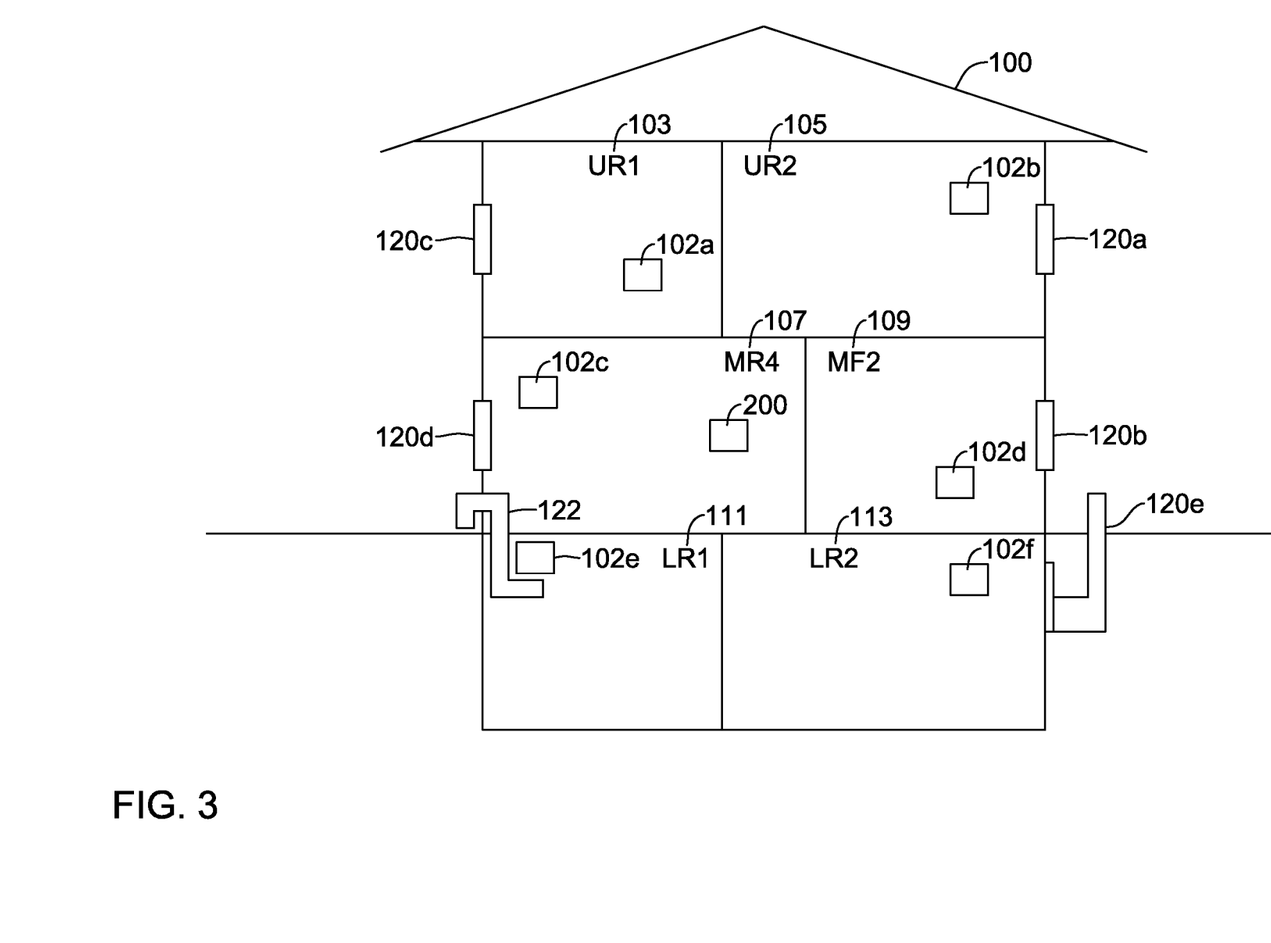
FIG. 3 is a schematic view of a building illustrating possible sensor locations within the building.

FIG. 3 is a schematic illustration of a building 100 that may be considered as including at least some of the features of the building 2 (FIG. 1). As illustrated, the building 100 may be divided into distinct building spaces labeled Upper Room 1 (UR1) 103, Upper Room 2 (UR2) 105, Main Room 1 (MR1) 107, Main Room 2 (MR2) 109, Lower Room 1 (LR1) 111, and Lower Room 2 (LR2) 113. Each of the building spaces UR1 103, UR2 105, MR1 107, MR2 109, LR1 111, and LR2 113 may be separate rooms, for example. Alternatively, one or more of the building spaces UR1 103, UR2 105, MR1 107, MF2 109, LR1 111, and LR2 113 may instead refer to sections or portions of the building 100. As shown in FIG. 3, each of the building spaces UR1 103, UR2 105, MR1 107, MF2 109, LR1 111, and LR2 113 can be seen as including wireless sensors 102a, 102b, 102c, 102d, 102e, and 102f (hereinafter generally referenced as sensors 102). The sensors 102 may, for example, be considered as being an example of the remote sensor 21 (FIG. 1). Sensors 102 may represent a variety of different sensors, including but not limited to, a temperature sensor, a humidity sensor, a pressure sensor, a flow sensor, a motion sensor, an occupancy sensor, a contact sensor, a light sensor, and/or any other suitable sensor. These are just some example wireless sensors that may be connected to the building controller 200, and incorporated into the HVAC system 4. In some cases, the HVAC system 4 may include temperature sensors located at different locations throughout the building 100.

In the example shown in FIG. 3, the HVAC system 4 may include wireless sensors 102 mounted to a wall of the building 100 (e.g., sensors 102a, 102c) at a location that is remote from the building controller 200. In some cases, the HVAC system 4 may include wireless sensors mounted in a space at or adjacent to a water pipe 122 (e.g., sensor 102e). In other cases, the HVAC system 4 may include wireless sensors at or adjacent to a window 120a, 120b, 120e (e.g., sensors 102b, 102d, 102f). These are just some example locations. As illustrated, the sensors 102 may be in wireless communication with the building controller 200. Alternatively, or in addition, the sensors 102 may be hardwired to the building controller 200. In some cases, some of the sensors 102 may be hardwired to the building controller 200, or may be in communication with the building controller 200 via a wiring backbone (not illustrated) within the building while others of the sensors 102 may be in wireless communication with the building controller 200.

In some instances, at least some of the sensors 102 may be installed at the same time as the building controller 200 (e.g. new installation). In other instances, at least some of the sensors 102 may be installed in a building or structure that already has an existing building controller 200 (e.g. post-installation). In either case, a communication link may need to be established between the sensors 102 and the building controller 200 so that the building controller 200 may send and/or receive data and/or commands to and/or from the sensors 102. In some instances, the sensors 102 may be configured to send data to the building controller 200 via a one-way, wireless communication link. In other cases, the sensors 102 may be configured to send and/or receive commands to and from the building controller 200 via a two-way, wireless communication link. The one-way, wireless communication link and/or the two-way, wireless link may include, but are not limited to, cellular communication, ZigBee, REDLINK™, Bluetooth, WiFi, IrDA, dedicated short range communication (DSRC), EnOcean, and/or any other suitable common or proprietary wireless protocol, as desired. The communication link established between the sensors 102 and the one or more building controllers 200 may be a direct communication link, or alternatively, an indirect communication link where communication between the control unit and the one or more building controllers 200 is routed through a communications device such as, for example, the communications gateway 23 as shown in FIG. 1.

Figure 4:
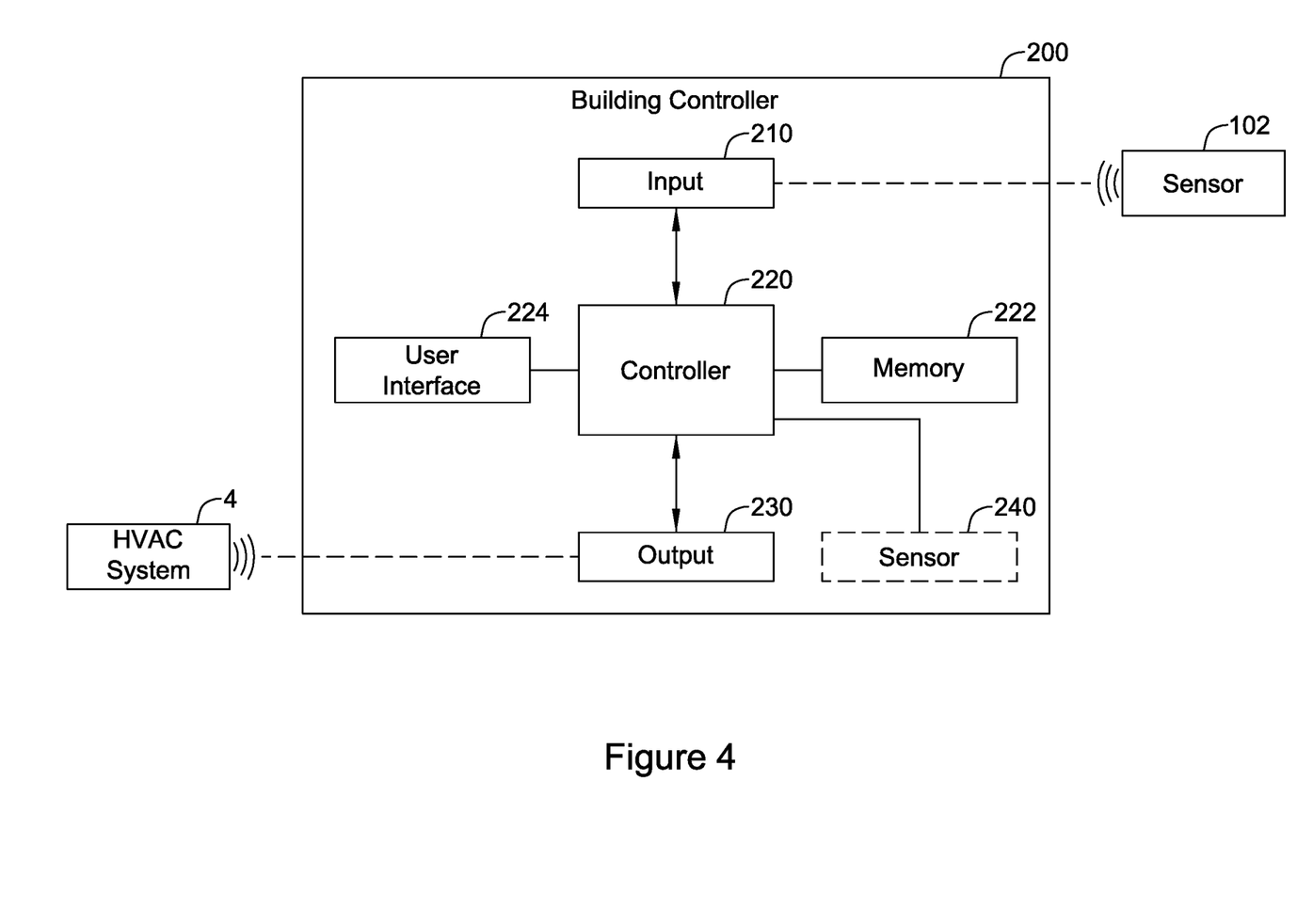
FIG. 4 is a schematic block diagram of an illustrative HVAC building controller.

FIG. 4 is a schematic block diagram of the illustrative building controller 200, as shown in FIG. 3. In some instances, the building controller 200 may considered as an example of the HVAC controller 18 referenced in FIGS. 1 and 2. In some cases, the building controller 200 may be a wall mountable thermostat and may include a temperature sensor and/or humidity sensor, but this is not required. In some instances, and with particular reference to FIG. 4, the building controller 200 may include a memory 222 for storing one or more parameter values (e.g., a programmed temperature set point), and a user interface 224 including a display (not shown), but this is not required. The memory 222 may be any suitable type of storage device including, but not limited to, RAM, ROM, EPROM, flash memory, a hard drive, and/or the like.

In some instances, a user interface (not shown) may be provided that is separate from the building controller 200 and that facilitates a user's interactions with the building controller 200 located within the building. The user interface may be provided by a number of remote internet devices, including a smart phone, a tablet computer, a laptop computer, or a desktop computer. In some cases, the user interface may communicate with the building controller 200 via a router such as, for example, a Wi-Fi or Internet router.

In other cases, the user interface may be provided at the building controller 200 and share a common housing with the building controller 200, as indicated by the user interface 224.

The building controller 200 may further include one or more inputs 210 for receiving signals from the sensors 102, one or more outputs 230 for providing signals to the HVAC system 4, and a controller (e.g., a microprocessor, microcontroller, etc.) 220, which may be operatively coupled to the user interface 224, the memory 222, the one or more inputs 210 and/or the one or more outputs 230. As noted with respect to FIG. 3, the building controller 200 may be configured to receive signals from a plurality of sensors (such as the sensors 102a, 102b, 102c, 102d, 102e, and 102f, as shown in FIG. 3) that are positioned in different spaces within the building 100. In some cases, one of the sensors 102 may be located within the building controller 200, as indicated by sensor 240 shown in FIG. 4, and at least one of the sensors 102 may be a remote sensor that is remote from the building controller 200.

In some instances, the building controller 200 may be configured to receive a signal from the sensors 102 located throughout the building 100, via the one or more inputs 210. In some cases, the one or more inputs 210 may be a wireless receiver or a wireless transceiver. The sensors 102 of FIG. 4 may be examples of wireless sensors 102a, 102b, 102c, 102d, 102e, and 102f of FIG. 3. The sensors 102 may be a temperature sensor, a humidity sensor, a pressure sensor, a flow sensor, a motion sensor, an occupancy sensor, a contact sensor, a light sensor, and/or any other suitable sensor. In some cases, at least some of the one or more sensors may be integrated with and form a part of the building controller 200, as indicated by the sensor 240. In other cases, the sensors 102 may be provided as separate components of the HVAC system 4. In still other instances, some of the sensors 102 may be separate components of the HVAC system 4 while others (e.g., sensor 240) may be integrated with the building controller 200. These are just some example configurations.

The controller 220 may be configured to use the signal(s) received from the sensors 102, via the one or more inputs 210, to operate or coordinate operation of the HVAC components 6 by providing one or more control signals to the HVAC system 4 of the building 100 via the one or more outputs 230. In some cases, at least one of the sensors 102 may be a temperature sensor configured to send a signal indicative of the current temperature corresponding to a particular space in which each sensor is located. The one or more inputs 210 of the building controller 200 may receive the signal indicative of the current temperature from the temperature sensor 102. In response, the one or more outputs 230 of the building controller 200 may send a command to the HVAC system 4 to activate and/or deactivate one or more HVAC components 6 in that room or zone to regulate the temperature in accordance with a programmed temperature set point.

The controller 220 may be configured to use the signals received from the sensors 102 so as to control the HVAC system 4 in accordance with the programmed temperature set point. In some cases, the programmed temperature set point may include an extremum temperature set point. In some cases, the programmed temperature set point may include a comfort temperature set point. In other cases, the programmed temperature set point may include an away temperature set point, which may include the extremum temperature set point. These are just some examples.

In some cases, the extremum temperature set point may include a minimum temperature set point which may include a temperature such that a water pipe (e.g., water pipe 122) will not freeze (e.g., 40 degrees Fahrenheit, or 45 degrees Fahrenheit, or any other suitable temperature). In some cases, the extremum temperature set point may include a maximum temperature set point which may include a temperature such that a room in a building (e.g., UR1 103 of building 100) will not get too hot (e.g., 85 degrees Fahrenheit, or 90 degrees Fahrenheit, or any other suitable temperature). In some cases, the controller 220 may be configured to use the signals received from two or more sensors 102 to control the HVAC system 4 using an extremum temperature set point that may include both a minimum temperature set point and a maximum temperature set point.

In some instances, the one or more inputs 210 may receive a temperature reading from each of two or more temperature sensors (e.g., sensors 102) located within the building 100 remote from the building controller 200. In some instances, the one or more inputs 210 may receive a temperature reading from one or more remote temperature sensors located remotely from the building controller (e.g., sensors 102) and one or more temperature sensors located within the building controller 200 (e.g., sensor 240). In other instances, the one or more inputs 210 may receive a temperature reading from one remote sensor, from two remote sensors, from three remote sensors, from four remote sensors, or any other number of sensors as so desired. These are just examples.

In some cases, separate temperature and condensation and/or humidity sensors may be provided in each space (e.g., spaces UR1 103, UR2 105, MR1 107, MF2 109, LR1 111, and LR2 113 of FIG. 3). In other cases, at least some of the sensors 102 may not only report the current temperature, but may also include a condensation and/or a humidity sensor to report an indication of current moisture level to the building controller 200. In some cases, for example, the control temperature may be equal to a blended value of the current temperature sensed by the sensor 240 and the current condensation level provided by at least one of the remote sensors 102 in the space in which the particular sensor that has a higher priority ranking is located, and wherein the blended value is increasingly influenced by the current condensation level provided by the at least one of the remote sensors 102 located in the higher priority ranking space. For example, the sensor 102 may be located at or adjacent to a window (e.g., window 120e) of the building 100 (e.g., sensor 102f). The sensor 102f may be a condensation sensor and may detect a rise in the moisture level in that particular space of the building 100 (e.g., dew or frost on the window 120e). In another example, the sensor 102 may be a humidity sensor and may report a rise in the relative humidity in that particular space of the building 100 (e.g., moisture level in the air of room UR1 103). The controller 220 may be configured to utilize the sensed relative humidity level in addition to the sensed temperature to produce an updated control temperature. The controller 220 may then be configured to control the HVAC system 4 in order to drive the control temperature towards the updated temperature set point. Additionally or alternatively, the controller 220 may be configured to utilize the sensed moisture level in addition to the sensed temperature to send a signal to the HVAC system 4 in order to control a ventilation system, and/or a humidifier, and/or the temperature so as to control the moisture level in that particular space in the building 100.

In some cases, the controller 220 may be configured to use the signals received from the sensors 102 and repeatedly determine an extremum temperature reading, so as to control the HVAC system 4 in accordance with the programmed temperature set point. In some cases, the programmed temperature set point may include the extremum temperature set point. The controller 220 may be configured to simultaneously monitor one or more secondary sensors (e.g., sensors 102) and receive one or more readings from the one or more secondary sensors. The one or more readings from the one or more secondary sensors may be indicative of one or more environmental parameters, such as, but not limited to, a condensation level, a humidity level, a moisture level, a temperature, etc.

For example, the controller 220 may control the HVAC system 4 using the programmed temperature set point. When the controller 220 monitors the one or more secondary sensors and receives a reading from the one or more secondary sensors (e.g., a condensation sensor 102f on a basement window 120e) indicating moisture is present on the window 120e, the controller 220 may send a signal to the HVAC system 4 to increase ventilation within the building 100 (e.g., bring dry air inside from the outside) and/or turn down the humidifier. In some instances, the controller 220 may send a signal to the HVAC system 4 to increase a current air temperature in order to increase the temperature of the inner surface of the glass, resulting in less condensation. In some cases when a condensation sensor is utilized, the condensation sensor may send a signal to the building controller 200 when moisture is sensed via a numerical value output (e.g., 0=no moisture, 3=a small amount of moisture, 5=a large amount of moisture, etc.), or a binary "yes" (moisture is present) or "no" (moisture is not present). These are just examples.

In some cases, the controller 220 may be configured to operate according to a programmed away control temperature set point. A user may set the away control temperature to an extremum temperature set point. In some cases, the away control temperature set point may be an energy saving set point. The controller 220 may be configured to operate according to a programmed temperature set point utilizing one particular sensor 102 located within the building 100. For example, if the building 100 will remain unoccupied for an extended period of time (e.g., closing down a cabin for the winter months), the user may program the building controller 200 to maintain a temperature adequate to prevent water pipes (e.g., water pipe 122 of FIG. 3) from freezing. The building controller 200 may utilize a sensor located at or adjacent to a water pipe 122 (e.g., sensor 102f) to control the HVAC system 4 in order to drive the control temperature towards the extremum temperature set point. Alternatively, the building controller 200 may further be configured to repeatedly (e.g., once every minute, and/or once every five minutes, and/or once every twenty minutes, and/or once every sixty minutes) determine an extremum temperature reading from the temperature readings of two or more temperature sensors located in the building 100, and provide one or more control signals to the HVAC system 4 of the building 100 via the one or more outputs 230 so as to control the extremum temperature reading in accordance with the programmed temperature set point.

In some cases, the away control temperature may be initiated by a geo-fence crossing event. The building controller 200 may be configured to receive information pertaining to whether an associated device (e.g., a mobile device) is present within the geo-fence and/or if the associated device is not present within the geo-fence. The controller 220 may be configured to control the HVAC system 4 in accordance with a user being present (e.g., operate the HVAC system 4 in accordance with a HOME setting) or with a user (or all users) being away (e.g., operate the HVAC system 4 in accordance with an AWAY setting). For example, each user or occupant of the building 100 may have an associated mobile device, or may have several associated mobile devices. In some cases, a user or occupant may have a mobile device associated with several different locations such as a home, a cabin or a place of work. The mobile device may communicate directly or indirectly with the building controller 200. In some cases, the mobile device communicates with a remote server, which in turn communicates with the building controller 200.

In some cases, the extremum temperature reading may be a minimum temperature reading from the temperature readings of the two or more temperature sensors 102, and the controller 220 may be configured to provide one or more control signals to the HVAC system 4 of the building 100 via the one or more outputs 230 so as to control the minimum temperature reading in a heating mode in accordance with the programmed temperature set point. In other cases, the extremum temperature reading may be a maximum temperature reading from the temperature readings of the two or more temperature sensors 102, and the controller 220 may be configured to provide one or more control signals to the HVAC system 4 of the building 100 via the one or more outputs 230 so as to control the maximum temperature reading in a cooling mode in accordance with the programmed temperature set point.

In some cases, the controller 220 may be configured to operate according to a programmed temperature set point utilizing one particular sensor 102, selected by the user, located within the building 100. While the controller 220 may be operating according to one sensor 102, in some cases, the building controller 200 may also monitor additional sensors 102 located throughout the building. The building controller 200 may receive a signal that a particular sensor (e.g., sensor 102e) indicating that the temperature at that particular sensor (e.g. sensor 102e) has fallen below the minimum extremum temperature. The controller 220 may then switch from operating in accordance with the programmed sensor to operating in accordance with the sensor 102e so as to control the minimum temperature reading in a heating mode in accordance with the programmed temperature set point, and prevent the water pipes from freezing. When the temperature has risen above the minimum temperature set point, the controller 220 may switch back and operate according to the sensor selected by the user.

In some cases, the controller 220 may control the HVAC system 4 of the building 100 according to a first energy saving temperature set point and a second energy saving temperature set point. The controller 220 may be programmed by a user to utilize a first sensor (e.g., sensors 102 or sensor 240) to maintain the first energy saving temperature set point. The controller 220 may further be programmed by a user to utilize a second sensor (e.g., sensors 102 or sensor 240) to maintain the second energy saving temperature set point. The controller 220 may then control the HVAC system 4 of the building 100 in a manner that controls a temperature reading from temperature sensors in accordance with a first energy saving temperature set point. The building controller 200 may receive a signal from the second sensor that the second sensor (e.g., sensor 102 or sensor 240) indicating that the temperature at the second sensor measured or otherwise determined by the second sensor has satisfied a predetermined condition (e.g., has fallen below the minimum extremum temperature or risen above the maximum extremum temperature). The controller 220 may then switch to controlling the HVAC system 4 of the building 100 in accordance with the second energy saving temperature set point.

As discussed, the controller 220 may be operably coupled to the user interface 224 and to the input 210. In some cases, the controller 220 may be configured to control the HVAC system 4 using a control temperature that is a weighted combination of two or more of the current temperatures being reported by the sensors 102. In some instances, the weighted combination is a weighted average of two or more of the current temperatures being reported by the plurality of sensors. The controller 220 may repeatedly receive, via the input 210, updated current temperatures from each of the sensors 102, and the controller 220 may be configured to utilize the updated current temperatures to produce an updated control temperature. The controller 220 may be configured to control the HVAC system 4 in order to drive the control temperature towards a temperature set point. In some cases, the HVAC system 4 may be a non-zoned HVAC system.

In some cases, at least some of the sensors 102 may include a priority ranking. In some instances, the controller 220 may be configured to assign higher weights to the current temperatures reported by the sensors that have a higher priority ranking and to assign lower weights to the current temperatures reported by the sensors that have a lower priority ranking. In some cases, to illustrate, the control temperature may be equal to a blended value of the current temperature sensed by the sensor 240 and the current temperature provided by at least one of the remote sensors 102 in the space in which the particular sensor that has a higher priority ranking is located, and wherein the blended value is increasingly influenced by the current temperature provided by the at least one of the remote sensors 102 located in the higher priority ranking space.

In some cases the controller 220 may be configured to be an AUTOCHANGEOVER mode, where the controller 220 automatically changes between a HEAT mode and a COOL mode in accordance with a sensed temperature in the building, a HEAT temperature set point and a COOL temperature set point. This means that there may be a HEAT temperature set point and a COOL temperature set point both active at the same time. If a sensed temperature within the building drops below the HEAT temperature set point, and beyond a hysteresis factor, the controller 220 will turn on the heat to control to the HEAT temperature set point. If a sensed temperature within the building increases above the COOL temperature set point, and beyond a hysteresis factor, the controller 220 will turn on the air conditioning or other cooling apparatus to control to the COOL temperature set point. In some cases, spring and fall days may provide examples of when the heat and the air conditioning may legitimately both be used in the course of a single day. An overnight temperature may be low enough to justify turning on the heat. As the day heats up, the internal temperature of the building structure may increase to a point that cooling is justified.

In this, it will be appreciated that the COOL temperature set point must be higher than the HEAT temperature set point. In many cases, there is a minimum temperature difference, referred to as a deadband, which is enforced between the HEAT temperature set point and the COOL temperature set point. The deadband may be user-selectable and/or installer-selectable. In some instances, the deadband may be factory-programmable. In a particular example, the deadband may be 2 degrees or 3 degrees. It will be appreciated that if the system is in an AUTOCHANGEOVER mode, in which the controller 220 may be configured to automatically change between a HEAT mode and a COOL mode in accordance with a sensed temperature in the building, there can be difficulties if a user tries to adjust the HEAT temperature set point upwards too close to the COOL temperature set point, or if the user tries to adjust the COOL temperature set point downwards too close to the HEAT temperature set point.

Figure 5:
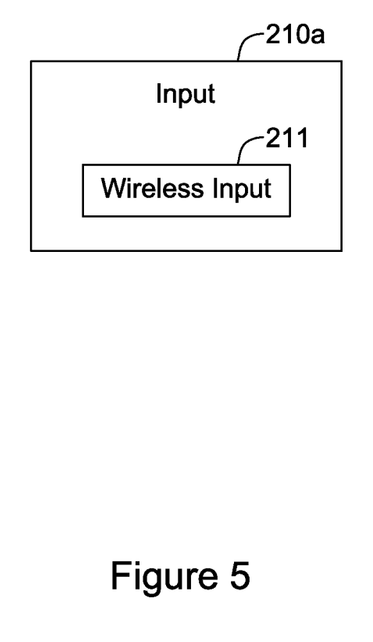
FIG. 5 is a schematic block diagram of an input forming part of the illustrative HVAC building controller of FIG. 4, including a wireless input.

FIG. 5 is a schematic block diagram of an illustrative input 210a of the building controller 200 of FIG. 4, including a wireless input 211. In some cases, the one or more inputs 210a may include a wireless input 211 for wirelessly receiving a temperature reading from one or more temperature sensors 102. The wireless input 211 may include one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

Figure 6:
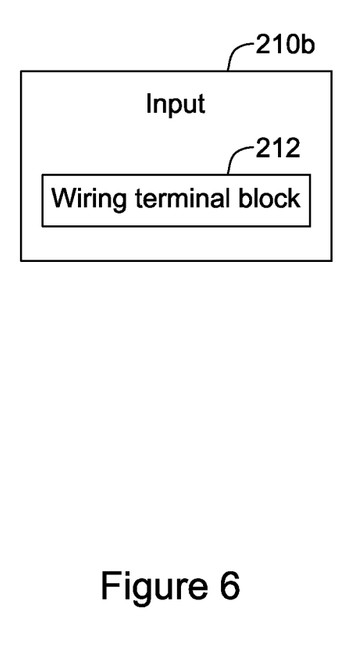
FIG. 6 is a schematic block diagram of an input forming part of the illustrative HVAC building controller of FIG. 4, including a wiring terminal block.

FIG. 6 is a schematic bloc diagram of an illustrative input 210b of the building controller 200 of FIG. 4, including a wiring terminal block 212. In some cases, the one or more inputs 210b may include a wiring terminal block 212 for receiving a temperature reading via two or more field wires (not shown) coupled to at least one or more temperature sensors 102. In some cases, the building controller 200 may include a wireless input and a wiring terminal block. These are just some examples.

Figure 7:
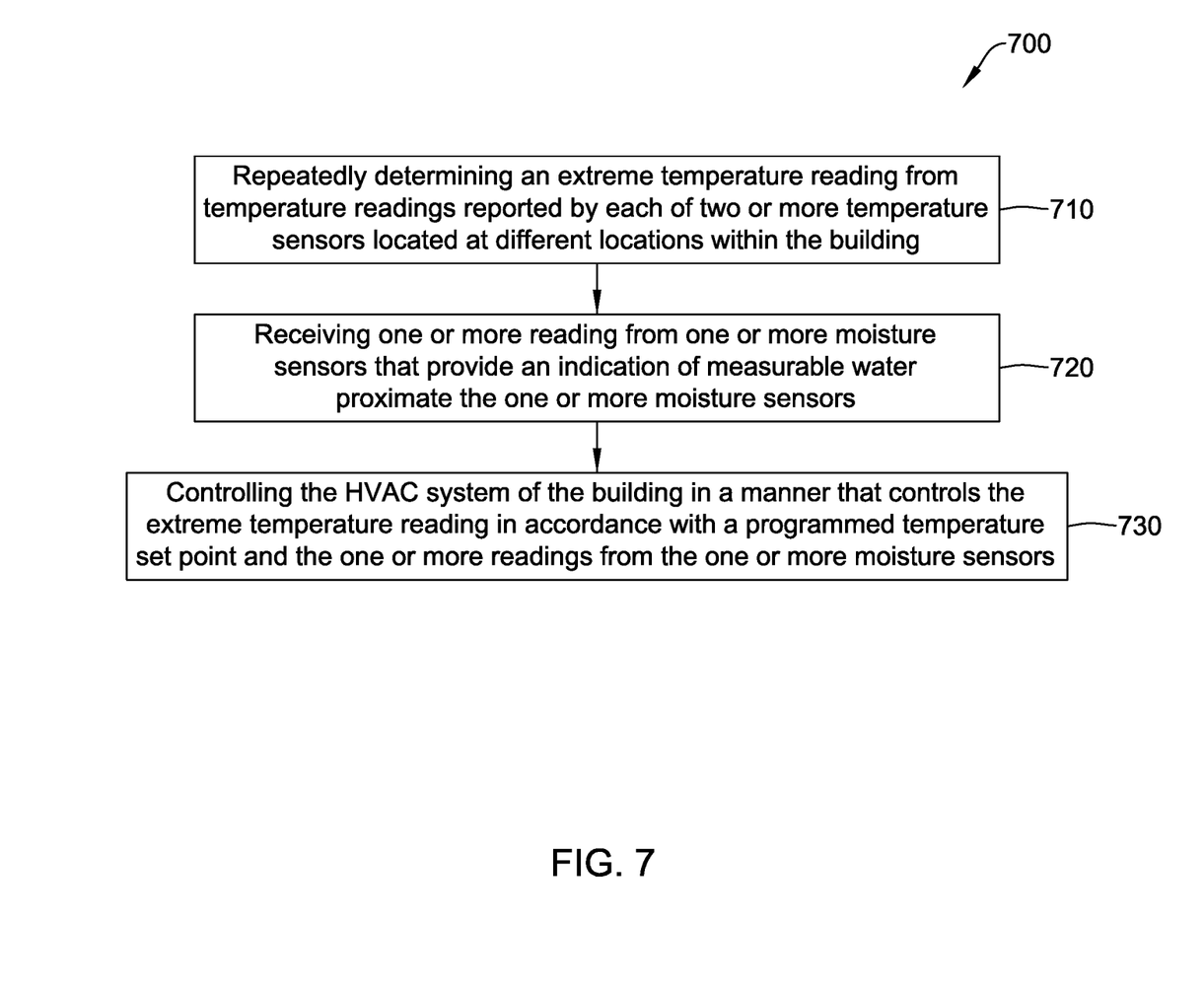
FIG. 7 is a flow diagram showing an illustrative method of controlling an HVAC system of a building.

FIG. 7 is a flow diagram showing an illustrative method 700 for controlling an HVAC system of a building. The method 700 may include a controller of the HVAC system receiving signals from one or more sensors located throughout the building via an input, and repeatedly determining an extremum temperature reading from temperature readings reported by each of two or more temperature sensors located at different locations within the building, as referenced at block 710. The controller may receive signals from one or more sensors so as to determine an extremum temperature reading once every minute, and/or once every five minutes, and/or once every twenty minutes, and/or once every sixty minutes. These time periods are merely illustrative. The controller may receive one or more readings from one or more moisture sensors that provide an indication of measurable water proximate the one or more moisture sensors, as referenced at block 720. The one or more moisture sensors may include a condensation sensor or a humidity sensor, for example. The controller may control the HVAC system of the building in a manner that controls the extremum temperature reading in accordance with a programmed temperature set point and the one or more readings from the one or more moisture sensors, as referenced at block 730. As discussed above with reference to FIG. 4, the extremum temperature set point may include a minimum temperature set point which may include a temperature such that a water pipe (e.g., water pipe 122) will not freeze (e.g., 40 degrees Fahrenheit, or 45 degrees Fahrenheit, or any other suitable temperature). In some cases, the extremum temperature set point may include a maximum temperature set point which may include a temperature such that a room in a building (e.g., UR1 103 of building 100) will not get too hot (e.g., 85 degrees Fahrenheit, or 90 degrees Fahrenheit, or any other suitable temperature). In some cases, the extremum temperature set point that may include both a minimum temperature set point and a maximum temperature set point. Further, the programmed temperature set point may be an energy saving set point.

Figure 8:
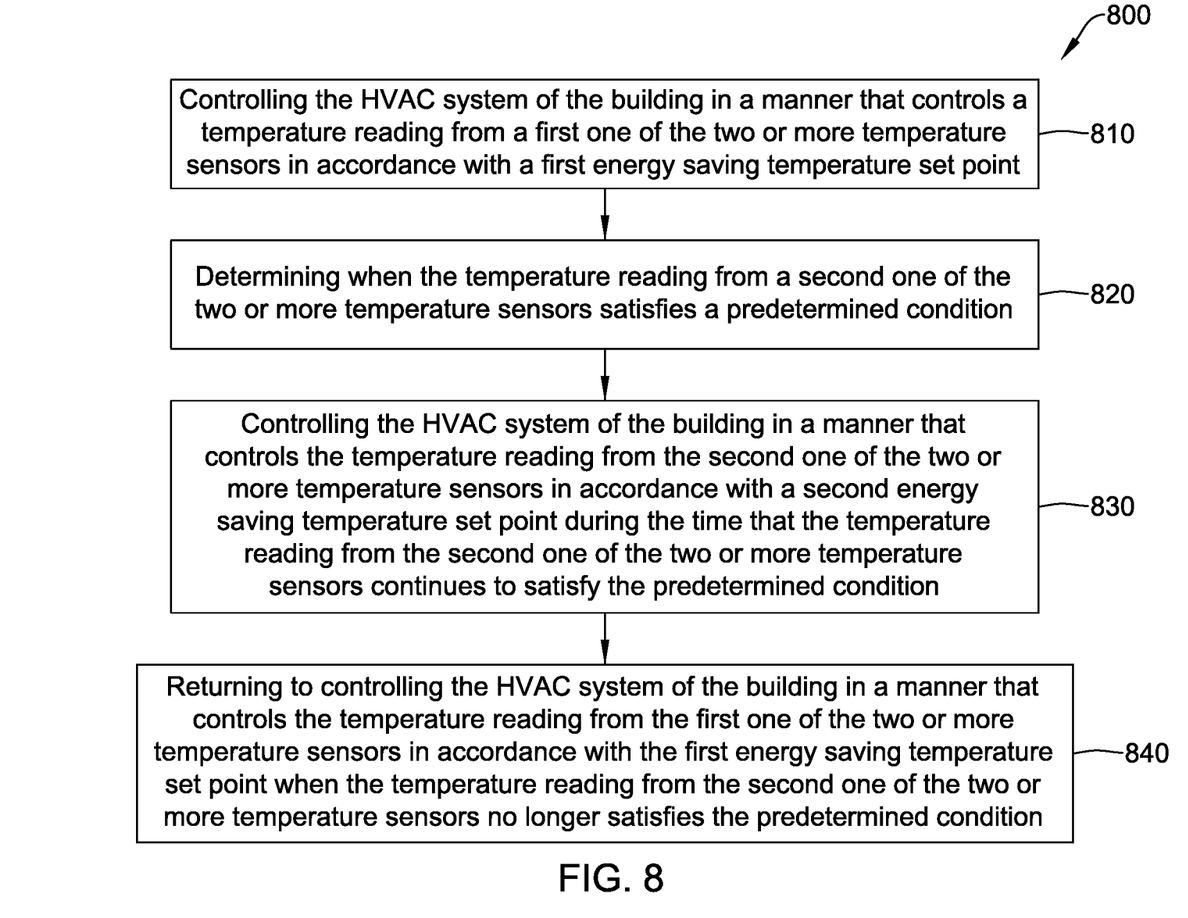
FIG. 8 is a flow diagram showing an illustrative method of controlling an HVAC system of a building.

FIG. 8 is a flow diagram showing an illustrative method 800 for controlling an HVAC system of a building. The method 800 may include a controller controlling the HVAC system of the building according to a first energy saving temperature set point and a second energy saving temperature set point. The controller may be programmed by a user to utilize a first sensor to maintain the first energy saving temperature set point. The controller may further be programmed by a user to utilize a second sensor to maintain the second energy saving temperature set point. The controller may receive a temperature reading from each of the two or more temperature sensors (e.g., the first sensor and the second sensor) spaced within the building, and the controller may then control the HVAC system of the building in a manner that controls a temperature reading from the first temperature sensor in accordance with a first energy saving temperature set point, as referenced at block 810. The controller may determine when the temperature reading from a second one of the two or more temperature sensors satisfies a predetermined condition (e.g., has fallen below the minimum extremum temperature or risen above the maximum extremum temperature), as referenced at block 820. The controller may control the HVAC system of the building in a manner that controls the temperature reading from the second one of the two or more temperature sensors in accordance with a second energy saving temperature set point during the time that the temperature reading from the second one of the two or more temperature sensors continues to satisfy the predetermined condition, as referenced at block 830. The controller may then return to controlling the HVAC system of the building in a manner that controls the temperature reading from the first one of the two or more temperature sensors in accordance with the first energy saving temperature set point when the temperature reading from the second one of the two or more temperature sensors no longer satisfies the predetermined condition, as referenced at block 840.

In some cases, the predetermined condition is satisfied when the temperature reading from the second one of the two or more temperature sensors reaches or falls below a minimum temperature threshold. In other cases, the predetermined condition is satisfied when the temperature reading from the second one of the two or more temperature sensors reaches or exceeds a maximum temperature threshold. In some cases, the second energy saving temperature set point is lower than the first energy saving temperature set point. In other cases, the second energy saving temperature set point is higher than the first energy saving temperature set point.

Figure 9:
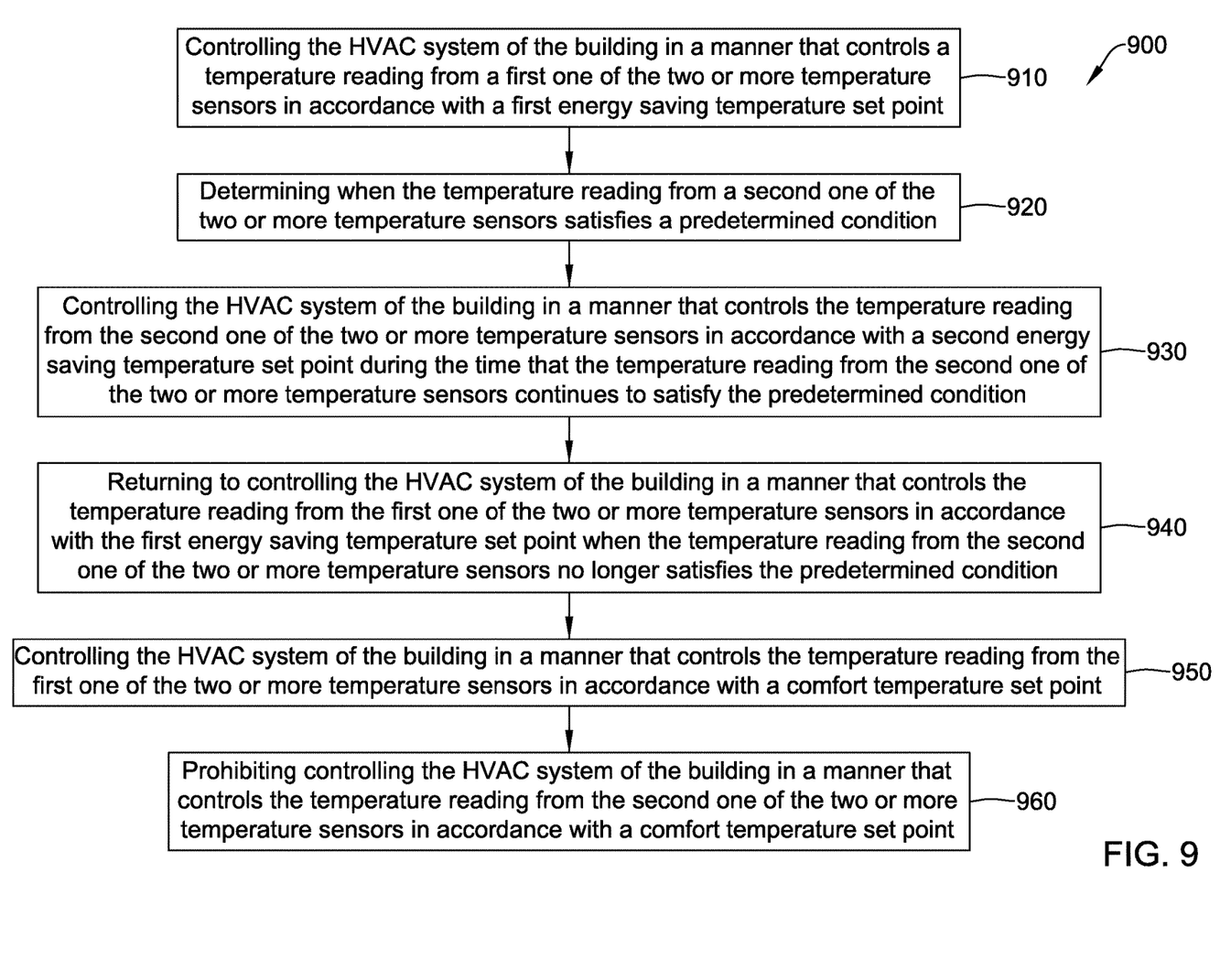
FIG. 9 is a flow diagram showing an illustrative of a method of controlling an HVAC system of a building.

FIG. 9 is a flow diagram showing an illustrative method 900 of controlling an HVAC system of a building. The method 900 may include a controller controlling the HVAC system of the building according to a first energy saving temperature set point and a second energy saving temperature set point. The controller may be programmed by a user to utilize a first sensor to maintain the first energy saving temperature set point. The controller may further be programmed by a user to utilize a second sensor to maintain the second energy saving temperature set point. The controller may receive a temperature reading from each of the two or more temperature sensors (e.g., the first sensor and the second sensor) spaced within the building, and the controller may then control the HVAC system of the building in a manner that controls a temperature reading from the first temperature sensor in accordance with a first energy saving temperature set point, as referenced at block 910. The controller may determine when the temperature reading from a second one of the two or more temperature sensors satisfies a predetermined condition (e.g., has reached or fallen below the minimum extremum temperature or risen above the maximum extremum temperature), as referenced at block 920. The controller may control the HVAC system of the building in a manner that controls the temperature reading from the second one of the two or more temperature sensors in accordance with a second energy saving temperature set point during the time that the temperature reading from the second one of the two or more temperature sensors continues to satisfy the predetermined condition, as referenced at block 930. The controller may then return to controlling the HVAC system of the building in a manner that controls the temperature reading from the first one of the two or more temperature sensors in accordance with the first energy saving temperature set point when the temperature reading from the second one of the two or more temperature sensors no longer satisfies the predetermined condition, as referenced at block 940.

The method 900 may further include the controller controlling the HVAC system of the building in a manner that controls the temperature reading from the first one of the two or more temperature sensors in accordance with a comfort temperature set point, as referenced at block 950. The comfort temperature set point may include a temperature set point programmed by a user, which may be equal to a blended value of the current temperature sensed by the first one of the two or more temperature sensors, and the current temperature provided by at least one of the remote sensors in a space in which the particular sensor that has a higher priority ranking is located, and wherein the blended value is increasingly influenced by the current temperature provided by the at least one of the remote sensors located in the higher priority ranking space. The controller may not allow the HVAC system of the building to be controlled in a manner that controls the temperature reading from the second one of the two or more temperature sensors in accordance with a comfort temperature set point, as referenced at block 960.

In some cases, the predetermined condition is satisfied when the temperature reading from the second one of the two or more temperature sensors reaches or falls below a minimum temperature threshold. In other cases, the predetermined condition is satisfied when the temperature reading from the second one of the two or more temperature sensors reaches or exceeds a maximum temperature threshold. In some cases, the second energy saving temperature set point is lower than the first energy saving temperature set point. In other cases, the second energy saving temperature set point is higher than the first energy saving temperature set point.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A building controller for controlling an HVAC system of a building, the building controller comprising:
   a memory;
   a controller operatively coupled to the memory, the controller configured to:
      receive a temperature reading from a first temperature sensor located within the building;
      cause the building controller to provide one or more control signals to the HVAC system of the building to control the temperature reading from the first temperature sensor in accordance with a programmed temperature set point;

repeatedly determine an extremum temperature reading from an extremum temperature sensor; and cause the building controller to provide one or more control signals to the HVAC system of the building to control the extremum temperature reading in accordance with an extremum temperature set point, wherein the extremum temperature set point comprises one of a heat set point that is lower than the programmed temperature set point or a cool set point that is higher than the programmed temperature set point.

2. The building controller of claim 1, wherein the extremum temperature reading is a minimum temperature reading from temperature readings of two or more temperature sensors, and the controller is configured to provide one or more control signals to the HVAC system of the building to control the minimum temperature reading in a heating mode in accordance with the extremum temperature set point.

3. The building controller of claim 2, wherein one of the two or more temperature sensors are located within a housing of the building controller.

4. The building controller of claim 3, wherein the building controller comprises a wall mountable thermostat.

5. The building controller of claim 2, wherein the two or more temperature sensors are located within the building and include at least two remote temperature sensors located remotely from the building controller.

6. The building controller of claim 1, wherein the extremum temperature reading is a maximum temperature reading from temperature readings of two or more temperature sensors, and the controller is configured to provide one or more control signals to the HVAC system of the building to control the maximum temperature reading in a cooling mode in accordance with the extremum temperature set point.

7. The building controller of claim 1, wherein the controller is configured to receive a temperature reading from the extremum temperature sensor via a wireless receiver.

8. The building controller of claim 1, wherein the controller is configured to receive a temperature reading via two or more field wires coupled to the extremum temperature sensor.

9. The building controller of claim 1, wherein the programmed temperature set point is an energy saving set point.

10. A method for controlling an HVAC system of a building, the method comprising:
receiving a temperature reading from a first temperature sensor within the building;
controlling the HVAC system of the building in a manner that controls the temperature reading from the first temperature sensor in accordance with a first energy saving temperature set point;
determining when the temperature reading from a second temperature sensor within the building satisfies a predetermined condition;
controlling the HVAC system of the building in a manner that controls the temperature reading from the second in accordance with a second energy saving temperature set point during the time that the temperature reading from the second temperature sensor continues to satisfy the predetermined condition;
returning to controlling the HVAC system of the building in a manner that controls the temperature reading from the first temperature sensor in accordance with the first energy saving temperature set point when the temperature reading from the second temperature sensor no longer satisfies the predetermined condition.

11. The method of claim 10, wherein the predetermined condition is satisfied when the temperature reading from the second temperature sensor falls below a minimum temperature threshold.

12. The method of claim 11, wherein the second energy saving temperature set point is higher than the first energy saving temperature set point.

13. The method of claim 10, wherein the predetermined condition is satisfied when the temperature reading from the second temperature sensor exceeds a maximum temperature threshold.

14. The method of claim 13, wherein the second energy saving temperature set point is lower than the first energy saving temperature set point.

15. The method of claim 10, further comprising:
controlling the HVAC system of the building in a manner that controls the temperature reading from the first temperature sensor in accordance with a comfort temperature set point; and
prohibiting controlling the HVAC system of the building in a manner that controls the temperature reading from the second temperature sensor in accordance with the comfort temperature set point.

16. The method of claim 15, wherein the second temperature sensor is located in a space adjacent a water pipe.

* * * * *